United States Patent [19]

Afsar et al.

[11] Patent Number: 5,664,120
[45] Date of Patent: Sep. 2, 1997

[54] METHOD FOR EXECUTING INSTRUCTIONS AND EXECUTION UNIT INSTRUCTION RESERVATION TABLE WITHIN AN IN-ORDER COMPLETION PROCESSOR

[75] Inventors: Muhammad Afsar; Soummya Mallick, both of Austin, Tex.

[73] Assignee: International Business Machines Corporation, Armonk, N.Y.

[21] Appl. No.: 519,557

[22] Filed: Aug. 25, 1995

[51] Int. Cl.⁶ .................................................. G06F 9/38
[52] U.S. Cl. ...................... 395/393; 395/800.23
[58] Field of Search ............................ 395/800, 390, 395/392, 393, 394

[56] References Cited

U.S. PATENT DOCUMENTS

| | | | |
|---|---|---|---|
| 4,574,349 | 3/1986 | Rechtschaffen | 395/481 |
| 4,903,196 | 2/1990 | Pomerene et al. | 395/393 |
| 4,969,091 | 11/1990 | Muller | 395/569 |
| 4,992,938 | 2/1991 | Cocke et al. | 395/393 |
| 5,041,968 | 8/1991 | Yamaguchi | 395/384 |
| 5,134,561 | 7/1992 | Liptay | 395/491 |
| 5,371,684 | 12/1994 | Iadonato et al. | 364/491 |
| 5,404,552 | 4/1995 | Ikenaga | 395/800 |
| 5,546,597 | 8/1996 | Martell et al. | 395/800 |
| 5,555,432 | 9/1996 | Hinton et al. | 395/800 |

FOREIGN PATENT DOCUMENTS

| | | |
|---|---|---|
| 0 495 162 A2 | 7/1992 | European Pat. Off. . |
| 0 614 138 A1 | 7/1994 | European Pat. Off. . |
| 0 606 697A1 | 7/1994 | European Pat. Off. . |
| WO 93/20505 | 10/1993 | WIPO . |
| WO 94/27205 | 11/1994 | WIPO . |

OTHER PUBLICATIONS

Karim, F.O. and Vrana, G.M., "Simultaneous Source/Target . . . ", IBM Technical Disclosure Bulletin, vol. 37 No. 04A, Apr. 1994, pp. 61–62.

Karim, F.O. and Vrana G.M., "Renaming of an Instruction . . . ", IBM Technical Disclosure Bulletin, vol. 37 No. 04B, Apr. 1994, pp. 589–590.

*Primary Examiner*—Parshotam S. Lall
*Assistant Examiner*—Viet Vu
*Attorney, Agent, or Firm*—Brian F. Russell; Andrew J. Dillon

[57] ABSTRACT

A method and apparatus for executing instructions within a processor which completes instructions according to a program order are disclosed. The processor has multiple rename buffers for temporarily storing results of instructions, a number of registers, and an execution unit. The execution unit has a reservation data structure comprising a plurality of entries for storing instructions to be executed by the execution unit and a single operand buffer for storing one or more operands of a single instruction. According to the present invention, an instruction is received at the execution unit. The instruction is then stored within the reservation data structure within the execution unit in association with information specifying a source of an operand of the instruction. Sources of operands of instructions include the rename buffers and the registers. A determination is then made if the instruction is a next instruction to be executed by the execution unit. In response to a determination that the instruction is the next instruction to be executed by the execution unit, the operand of the instruction is loaded from the specified source into the single operand entry. The instruction is then executed within the execution unit utilizing the operand within the single operand entry. By utilizing only a single operand buffer, processor chip area allocated to operand storage within the execution unit is reduced.

12 Claims, 4 Drawing Sheets

METHOD FOR EXECUTING INSTRUCTIONS AND EXECUTION UNIT INSTRUCTION RESERVATION TABLE WITHIN AN IN-ORDER COMPLETION PROCESSOR

BACKGROUND OF THE INVENTION

1. Technical Field

The present invention relates in general to a method and apparatus for data processing and in particular to data processing within an in-order completion processor. Still more particularly, the present invention relates to a method for executing instructions within an in-order completion processor and an improved instruction reservation table within an execution unit of an in-order completion processor.

2. Description of the Related Art

State-of-the-art superscalar processors include a number of execution units which each execute instructions belonging to a particular class of instructions. For example, a typical superscalar processor includes a fixed-point unit (FXU) for executing fixed-point instructions, a floating-point unit (FPU) for executing floating-point instructions, and a load/store unit for loading data from and storing data to memory. During each processor cycle, one or more instructions within a particular class of instructions are dispatched to each of the multiple execution units. Because each execution unit contains limited execution resources (e.g., a typical FXU has one adder, one multiplier, and one logical unit) and because operands for instructions may not be immediately available following dispatch, each execution unit provides facilities known as a reservation table (station) which stores instructions within the execution unit until the instructions are executed.

Referring now to FIG. 4, there is depicted a conventional reservation table within an execution unit of a superscalar processor which employs a renaming architecture. Reservation table 200 includes a number of entries 202, which each store an instruction in association with an instruction ID, rA tag, rB tag, and rD tag. The instruction ID is utilized by the processor to track the program order of instructions throughout the stages of execution. The rA tag and rB tag associated with an instruction indicate the sources of the A and B operands of an instruction, respectively. For example, if the execution unit is a FXU, the rA tag and rB tag of an instruction specify which general purpose registers (GPR) or GPR rename buffers are the sources of the A and B operands of the instruction. Conversely, the rA and rB tags specify which floating-point registers (FPR) or FPR rename buffers are the sources of the A and B operands if the execution unit is a FPU. The rD tag specifies the destination GPR or FPR rename buffer into which the result of the instruction will be stored. Finally, each entry 202 has an operand field for storing operands of the instruction. As illustrated, operands are loaded from the sources specified by the rA and rB tags into the operand field of an entry 202 as soon as the operands become valid. When both the A and B operands of an instruction are loaded into the operand field of an entry 202, execution logic 204 selects the instruction within that entry 202 as the next instruction to be executed by the execution unit.

Although the design of reservation table 200 provides a high performance interface between the execution unit and the operand sources within the processor, reservation table 200 is expensive in terms of the processor chip area required by reservation table 200 to store operands. For example, if the processor utilizes 64 bit operands, 128 bits of storage are required for the operand field of each entry 202 within reservation table 200. In high performance processors which dispatch a large number of instructions each cycle, thereby requiring a deep reservation table, the processor chip area allocated to the reservation table is particularly significant.

Consequently, it would be desirable to provide an improved reservation table within an execution unit of a processor and an improved method for executing instructions within an execution unit of a processor, such that the processor chip area consumed by the reservation table is reduced.

SUMMARY OF THE INVENTION

It is therefore one object of the present invention to provide an improved method and system for data processing.

It is another object of the present invention to provide an improved method and system for data processing within an in-order completion processor.

It is yet another object of the present invention to provide an improved method for executing instructions and an improved instruction reservation table within an execution unit of an in-order completion processor.

The foregoing objects are achieved as is now described. A method and apparatus for executing instructions within a processor which completes instructions according to a program order are disclosed. The processor has multiple rename buffers for temporarily storing results of instructions, a number of registers, and an execution unit. The execution unit has a reservation data structure comprising a plurality of entries for storing instructions to be executed by the execution unit and a single operand buffer for storing one or more operands of a single instruction. According to the present invention, an instruction is received at the execution unit. The instruction is then stored within the reservation data structure within the execution unit in association with information specifying a source of an operand of the instruction. Sources of operands of instructions include the rename buffers and the registers. A determination is then made if the instruction is a next instruction to be executed by the execution unit. In response to a determination that the instruction is the next instruction to be executed by the execution unit, the operand of the instruction is loaded from the specified source into the single operand entry. The instruction is then executed within the execution unit utilizing the operand within the single operand entry. By utilizing only a single operand buffer, processor chip area allocated to operand storage within the execution unit is reduced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
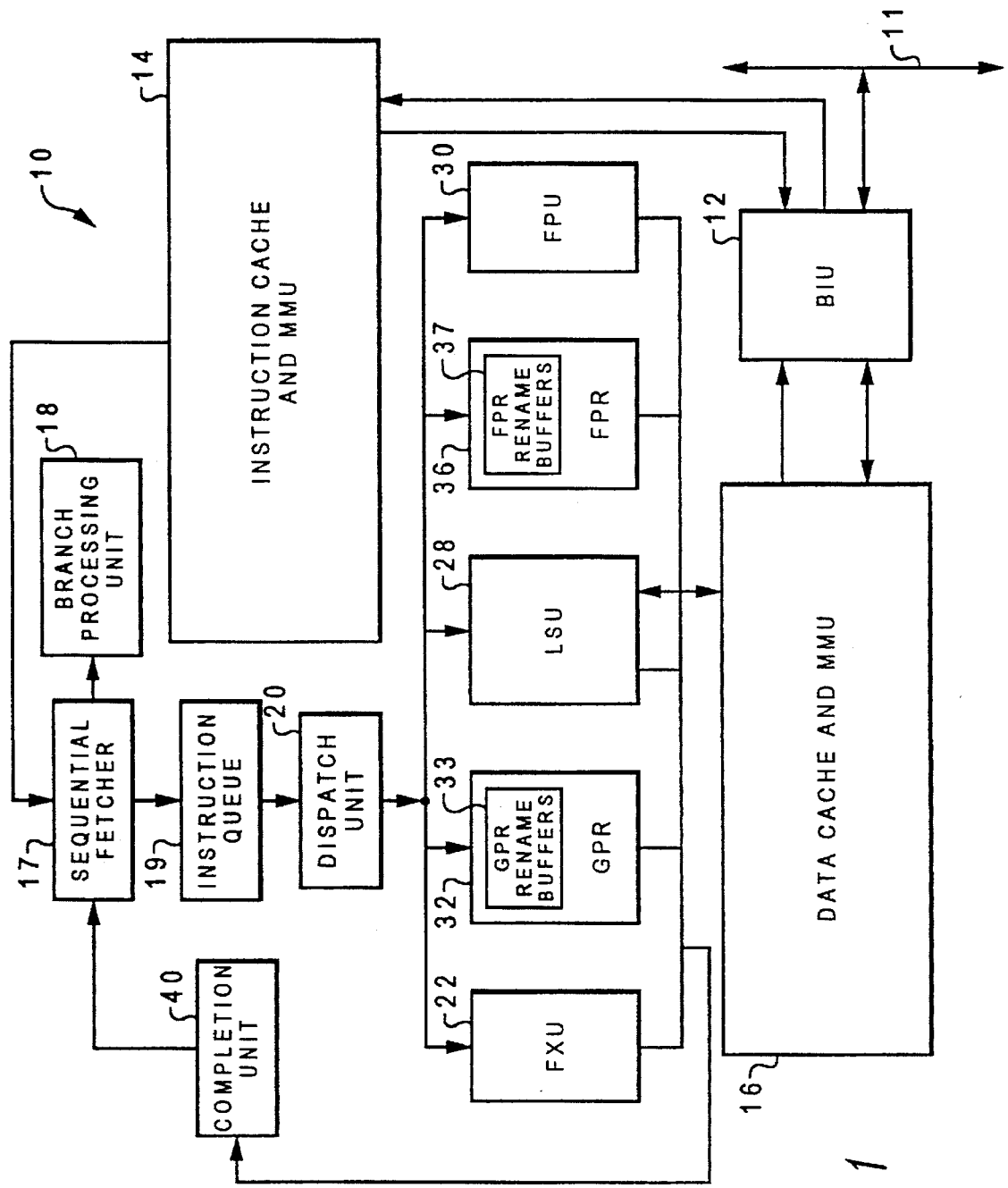
FIG. 1 illustrates a block diagram of a preferred embodiment of a processor which utilizes the method and system of the present invention.

With reference now to the figures and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor. Accordingly, as discussed further below, processor 10 includes various execution units, registers, buffers, memories, and other functional units, which are all formed by integrated circuitry. In a preferred embodiment of the present invention, processor 10 comprises one of the PowerPC™ line of microprocessors, which operates according to reduced instruction set computing (RISC) techniques. As depicted in FIG. 1, processor 10 is coupled to system bus 11 via a bus interface unit (BIU) 12 within processor 10. BIU 12 controls the transfer Of information between processor 10 and other devices coupled to system bus 11, such as a main memory (not illustrated). Processor 10, system bus 11, and the other devices coupled to system bus 11 together form a host data processing system.

BIU 12 is connected to instruction cache 14 and data cache 16 within processor 10. High speed caches, such as instruction cache 14 and data cache 16, enable processor 10 to achieve relatively fast access time to a subset of data or instructions previously transferred from main memory to caches 14 and 16, thus improving the speed of operation of the host data processing system. Instruction cache 14 is further coupled to sequential fetcher 17, which fetches instructions from instruction cache 14 during each cycle for execution. Sequential fetcher 17 transmits branch instructions fetched from instruction cache 14 to branch processing unit (BPU) 18 for execution, but temporarily stores sequential instructions within instruction queue 19 for execution by other execution circuitry within processor 10.

In the depicted embodiment, in addition to BPU 18, the execution circuitry of processor 10 comprises multiple execution units, including fixed-point unit (FXU) 22, load/store unit (LSU) 28, and floating-point unit (FPU) 30. As is well-known to those skilled in the computer arts, each of execution units 22, 28, and 30 executes one or more instructions within a particular class of sequential instructions during each processor cycle. For example, FXU 22 performs fixed-point mathematical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 executes floating-point and fixed-point instructions which either load data from memory (i.e., either data cache 16 or main memory) into selected GPRs 32 or FPRs 36 or which store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. In contrast, sequential fetcher 17 removes branch instructions from the instruction stream and forwards them to BPU 18 for execution. BPU 18 includes a branch prediction mechanism, which in a preferred embodiment comprises a dynamic prediction mechanism such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to the appropriate ones of execution units 22, 28, and 30. Also during the decode/dispatch stage, dispatch unit 20 allocates a rename buffer within GPR rename buffers 33 or FPR rename buffers 37 for each dispatched instruction's result data. According to a preferred embodiment of the present invention, processor 10 dispatches instructions in program order and tracks the program order of the dispatched instructions during out-of-order execution utilizing unique instruction identifiers. In addition to an instruction identifier, each instruction within the execution pipeline of processor 10 has an rA tag and a rB tag, which indicate the sources of the A and B operands for the instruction, and a rD tag that indicates a destination rename buffer within GPR rename buffers 33 or FPR rename buffers 37 for the result data of the instruction.

During the execute stage, execution units 22, 28, and 30, execute instructions received from dispatch unit 20 opportunistically as operands and execution resources for the indicated operations are available. As will be described in greater detail below, each of execution units 22, 28, and 30 are equipped with a reservation table that stores dispatched instructions for which operands or execution resources are unavailable. After execution has terminated, execution units 22, 28, and 30 store result data within either GPR rename buffers 33 or FPR rename buffers 37, depending upon the instruction type. Then, execution units 22, 28, and 30 notify completion unit 40 which instructions have finished execution. Finally, according to the present invention, instructions are completed by completion unit 40 in program order by transferring result data from GPR rename buffers 33 and FPR rename buffers 37 to GPRs 32 and FPRs 36, respectively. As will be described below, in-order completion of instructions permits the size of the reservation table within each of execution units 22, 28, and 30 to be greatly reduced according to the present invention.

Figure 2:
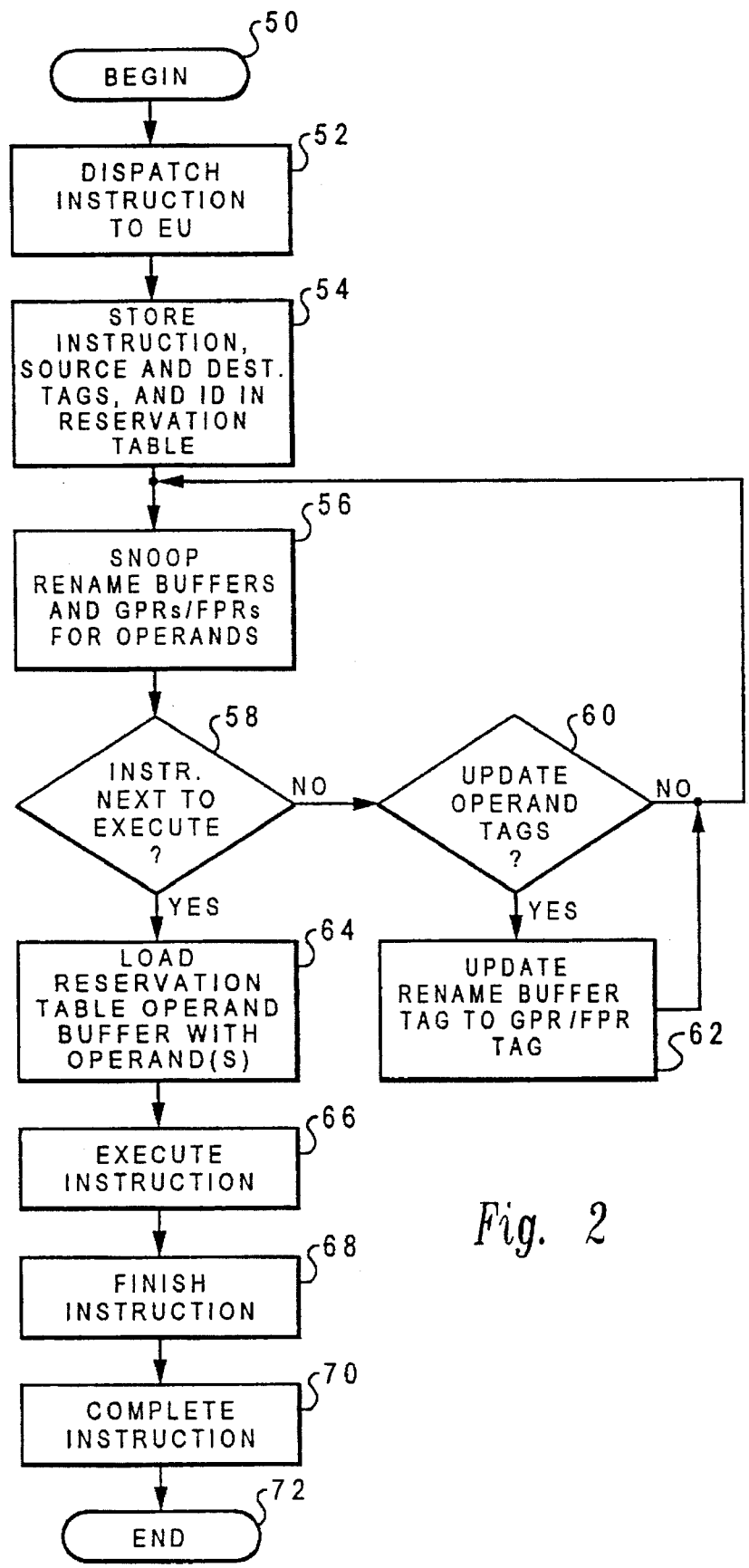
FIG. 2 is a flowchart illustrating the method of executing instructions within an execution unit according to a preferred embodiment of the present invention.

Referring now to FIG. 2, there is depicted a flowchart of a method of executing instruction within a superscalar processor according to a preferred embodiment of the present invention. As illustrated, the process begins at block 50 and thereafter proceeds to block 52, which depicts dispatch unit 20 dispatching an instruction to one of execution units 22, 28, or 30. Upon receipt of the instruction by one of execution units 22, 28, and 30, the instruction is stored within the execution unit's reservation table 80 in association with the instruction's ID, operand source tags, and a result data destination tag.

Figure 3:
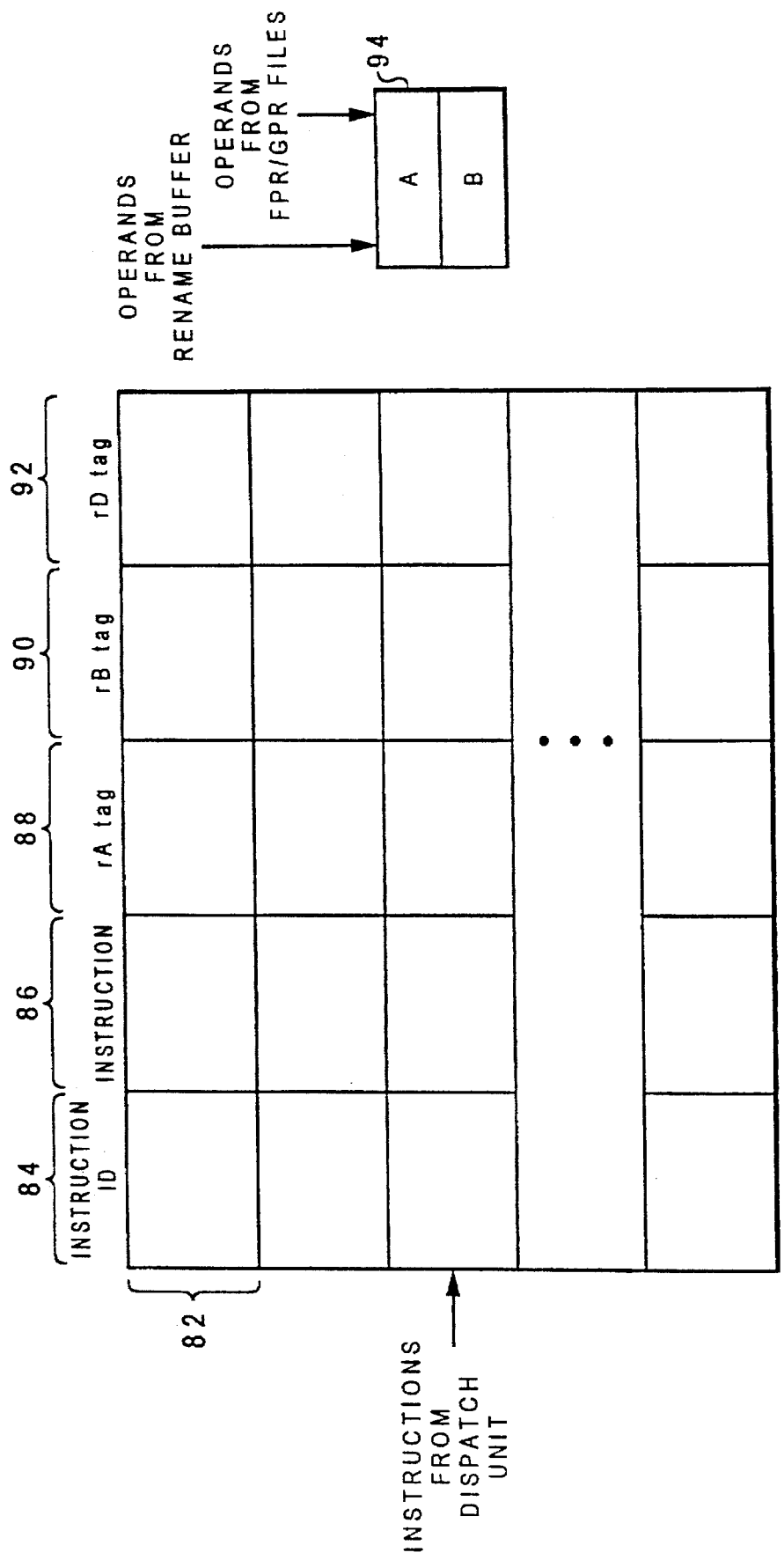
FIG. 3 is a block diagram of a reservation table within an execution unit of a processor according to a preferred embodiment of the present invention.

With reference now to FIG. 3, reservation table 80 comprises a number of entries 82, which each include instruction ID field 84, instruction field 86, rA tag field 88, rB tag field 90, and rD tag field 92. Fields 88–92 specify the sources of the A and B operands of an instruction and the target or destination rename buffer of an instruction, respectively. In a preferred embodiment of the present invention, the rA tag and rB tag indicate whether the source of the associated operand is a rename buffer or a register file by the state of the first tag bit. Thus, if bit(O)=0, the remaining bits within the tag are a binary representation of the register number within the register file which stores the operand. Alternatively, if bit(O)=1, the remaining bits within the tag specify the source rename buffer in a decoded format in which the position of a set bit within the tag indicates the source rename buffer. For example, if rA tag field 88 of a particular entry 82 stores the value "100100", the source of the A operand of the instruction specified within instruction field 86 is rename buffer 2. However, if the rA tag is "011001", the source of the A operand of the instruction is register 25 within the appropriate register file. Similarly, the rD tag of an entry 82 indicates the destination rename buffer of an instruction in decoded format. The rD tag utilizes one less bit than the rA and rB tags since the immediate destination of the result data of an instruction in processor 10 is always a rename buffer and never a register within a register file. According to an important aspect of the present invention, reservation table 80 includes only a single operand field 94, which stores the operand or operands of the next instruction to be executed by the execution unit. Thus, because reservation table 80 stores operands for only a single instruction, the present invention greatly reduces the processor chip area allocated to reservation table operand storage.

Returning to FIG. 2, the process proceeds from block 54 to block 56, which depicts the execution unit snooping GPRs 32, GPR rename buffers 33, FPRs 36, and FPR rename buffers 37, as indicated by the values of rA tag field 88 and rB tag field 90, to determine if the operands of the instruction are valid. As will be appreciated by those skilled in the art, operands of an instruction are valid within a rename buffer if the instruction for which that rename buffer is a target has finished, but has not completed. In contrast, an operand of an instruction is valid within GPRs 32 or FPRs 36 if the instruction for which the operand was a result has already been completed. The process then proceeds to block 58, which illustrates making a determination of whether the instruction within an entry 82 is the next instruction to be executed by the execution unit. The timing of execution of an instruction depends not only upon the availability of operands (data dependency), but also on the availability of execution resources within the execution unit. As is typical of superscalar processors, each of execution unit 22, 28, and 30 has facilities to execute only one instruction of each class of instruction during a processor cycle. For example, FXU 22 has a single adder, which can add only two operands at a time.

If a determination is made at block 58 that the instruction within entry 82 is not the next instruction to be executed by the execution unit, the process proceeds to block 60. At block 60, reservation table 80 polls completion unit 40 to determine whether one or more instructions which supply operands for the current instruction have been completed. The completion of an instruction which supplies an operand of the current instruction indicates that the corresponding operand tag must be updated to specify the GPR 32 or FPR 36 which stores the operand. If no instructions which supply operands for the current instruction have been completed, the process returns to block 56. However, if completion unit 40 has completed one or more instructions which supply operands for the current instruction, the process passes to block 62, which illustrates reservation table 80 updating the rA and rB tags to indicate the GPR 32 or FPR 36 to which the operand or operands have been transferred. After rA tag field 88 and rB tag field 90 have been updated to reflect the new source of the operand or operands, the process returns to block 56. It is important to note that the method of updating operand tags illustrated in FIG. 2 only obtains for processors which complete instructions according to program order. In out-of-order completion machines, the register that stores the operand cannot be guaranteed to contain valid operand data when the contents of the register are subsequently loaded by the execution unit since a preceding instruction having the same register as a target and may complete after the current instruction, thereby overwriting the operand data.

Figure 4:
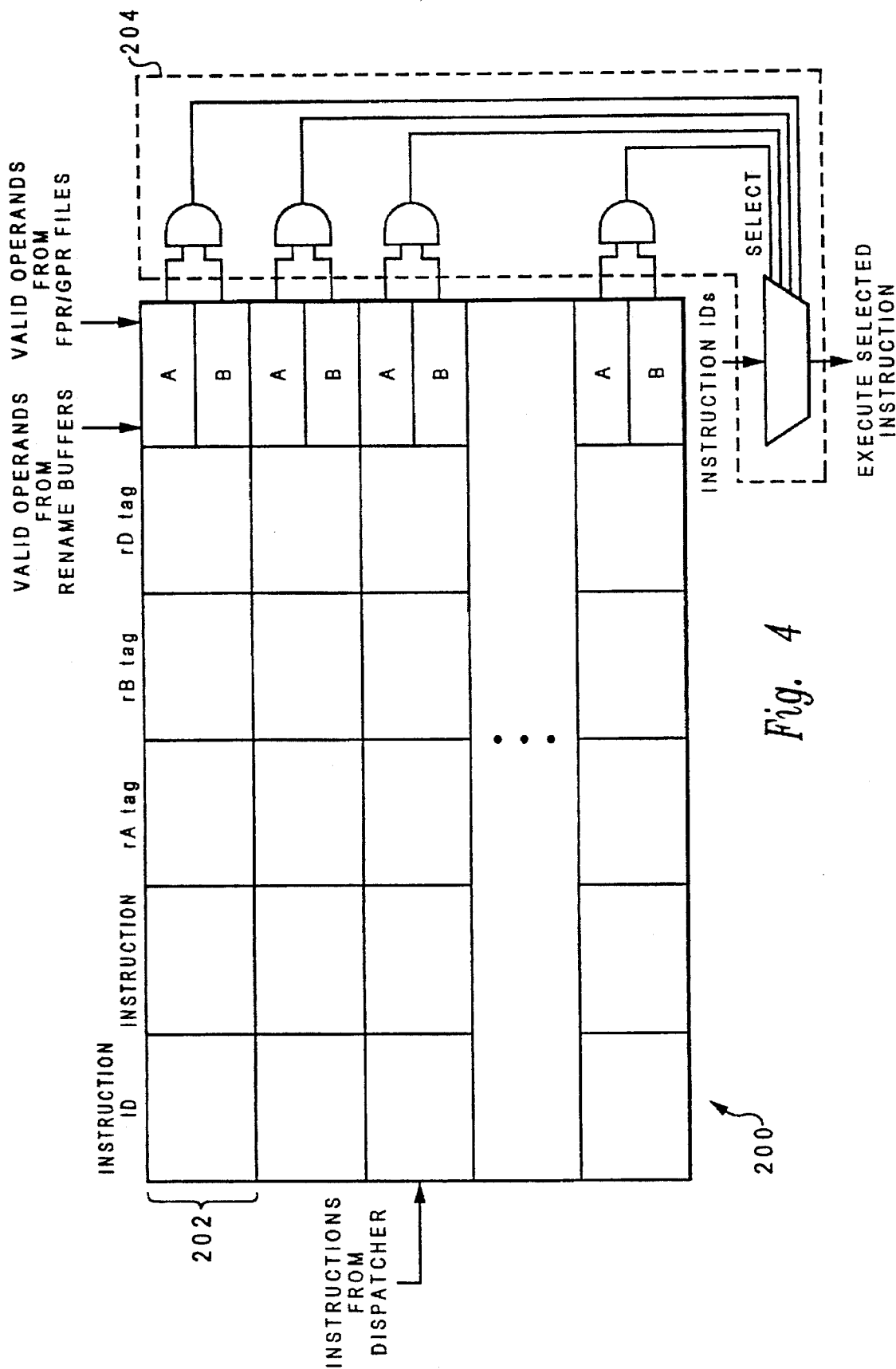
FIG. 4 depicts a prior art reservation table within an execution unit of a conventional processor.

Returning to block 58, if the instruction within entry 82 is the next instruction to be executed by the execution unit, the process proceeds to block 64, which depicts the execution unit loading the operands from the specified sources into operand field 94. Thus, in contrast to the prior art reservation table depicted in FIG. 4, operands are loaded into reservation table 80 only when the corresponding instruction is ready to be executed, and not when the operands become valid. The process then proceeds to block 66, which depicts the execution unit performing the operation upon the operands indicated by the instruction. Then, as illustrated at block 68, result data of the instruction are stored within the GPR rename buffer 33 or FPR rename buffer 37 specified within rD tag field 92 to finish the instruction. Finally, the instruction is completed at block 70 by transferring the result data from either GPR rename buffers 33 to GPRs 32 or from FPR rename buffers 37 to FPRs 36. The process then terminates at block 72.

As has been described, the present invention provides an improved reservation table design and method of executing instructions within an execution unit which reduce the silicon area consumed by the reservation table. By utilizing a single operand field within the reservation table rather than providing an operand field associated with each entry of the reservation table, the present invention enables the size of the reservation table to be greatly increased, concomitantly enhancing the performance of the processor without utilizing additional processor chip area. For example, in a typical implementation in which a processor has five GPR and five FPR rename buffers and the processor utilizes 64-bit operands, the number of entries within the reservation table can be doubled without consuming additional processor chip area.

While the invention has been particularly shown and described with reference to a preferred embodiment, it will be understood by those skilled in the art that various changes in form and detail may be made therein without departing from the spirit and scope of the invention.

What is claimed is:

1. A method for executing instructions within a processor, said processor having associated therewith a plurality of rename buffers which temporarily store results of instructions, a plurality of registers, and an execution unit, said execution unit having a reservation data structure, wherein said reservation data structure includes a plurality of entries which store instructions to be executed by said execution unit, and a single operand buffer, which stores one or more operands of a single instruction, wherein said processor completes instructions according to a program order, said method comprising:

receiving an instruction at said execution unit;

storing said instruction within said reservation data structure within said execution unit, said instruction being stored in association with information specifying a source of an operand of said instruction, wherein sources of operands of instructions include said plurality of rename buffers and said plurality of registers;

determining if said instruction is a next instruction to be executed by said execution unit;

in response to said determination, loading said operand of said instruction from said specified source into said single operand entry; and executing said instruction within said execution unit utilizing said operand within said single operand entry, wherein a portion of said reservation data structure allocated to operand storage is reduced.

2. The method for executing instructions within a processor of claim 1, said method further comprising:

in response to a determination that said instruction in not said next instruction to be executed by said execution unit, determining whether said information specifies that said source of said operand is said plurality of rename buffers and whether said operand is scheduled to be transferred from one of said plurality of rename buffers to one of said plurality of registers; and in response to a determination that said information specifies that said source of said operand is said plurality of rename buffers and that said operand is scheduled to be transferred, updating said information to indicate that said source of said operand is said plurality of registers.

3. The method for executing instructions within a processor of claim 2, said processor further comprising a completion unit which completes instructions executed by said processor according to said program order, wherein said step of determining whether said operand is scheduled to be transferred from one of said plurality of rename buffers to one of said plurality of registers comprises polling said completion unit to determine whether said instruction is scheduled for completion.

4. The method for executing instructions within a processor of claim 1, wherein said information also specifies a destination rename buffer among said plurality of rename buffers, said method further comprising:

finishing said instruction by storing a result of said instruction within said destination rename buffer; and thereafter, completing said instruction according to said program order by transferring said result from said destination rename buffer to one of said plurality of registers.

5. The method for executing instructions within a processor of claim 1, wherein said information comprises a tag stored within said reservation data structure that specifies which one of said plurality of rename buffers or said plurality of registers is said source of said operand.

6. The method for executing instructions within a processor of claim 1, wherein said step of determining whether said instruction is a next instruction to be executed comprises determining whether each operand of said instruction is available and whether a resource within said execution unit is available to perform an operation upon said each operand indicated by said instruction.

7. A processor, comprising:

a plurality of rename buffers for temporarily storing results of instructions;

a plurality of registers, wherein said processor completes instructions according to a program order by transferring results of instructions from particular rename buffers among said plurality of rename buffers to particular registers among said plurality of registers;

an execution unit, said execution unit having:

a reservation data structure, wherein said reservation data structure includes a plurality of entries for storing instructions to be executed by said execution unit and a single operand buffer for storing one or more operands of a single instruction;

means for receiving an instruction at said execution unit;

means for storing said instruction within said reservation data structure, wherein said instruction is stored in association with information specifying a source of an operand of said instruction, wherein sources of operands of instructions include said plurality of rename buffers and said plurality of registers;

means for determining if said instruction is a next instruction to be executed by said execution unit;

means for loading said operand of said instruction from said specified source into said single operand entry in response to a determination that said instruction is a next instruction to be executed by said execution unit; and means for executing said instruction utilizing said operand within said single operand entry, wherein a portion of said reservation data structure allocated to operand storage is reduced.

8. The processor of claim 7, and further comprising:

means, responsive to a determination that said instruction in not said next instruction to be executed by said execution unit, for determining whether said information specifies that said source of said operand is said plurality of rename buffers and whether said operand is scheduled to be transferred from one of said plurality of rename buffers to one of said plurality of registers; and means, responsive to a determination that said information specifies that said source of said operand is said plurality of rename buffers and that said operand is scheduled to be transferred, for updating said information to indicate that said source of said operand is said plurality of registers.

9. The processor of claim 8, said processor further comprising a completion unit which completes instructions executed by said processor according to said program order, wherein said means for determining whether said operand is scheduled to be transferred from one of said plurality of rename buffers to one of said plurality of registers comprises means for polling said completion unit to determine whether said instruction is scheduled for completion.

10. The processor of claim 8, wherein said information also specifies a destination rename buffer among said plurality of rename buffers, said processor further comprising:

means for finishing said instruction by storing a result of said instruction within said destination rename buffer; and means for thereafter completing said instruction according to said program order by transferring said result from said destination rename buffer to one of said plurality of registers.

11. The processor of claim 8, wherein said information comprises a tag stored within said reservation data structure that specifies which one of said plurality of rename buffers or said plurality of registers is said source of said operand.

12. The processor of claim 8, wherein said means for determining whether said instruction is a next instruction to be executed comprises means for determining whether each operand of said instruction is available and whether a resource within said execution unit is available to perform an operation upon said each operand indicated by said instruction.

* * * * *

UNITED STATES PATENT AND TRADEMARK OFFICE
CERTIFICATE OF CORRECTION

PATENT NO. : 5,664,120
DATED : September 2, 1997
INVENTOR(S) : Afsar et al.

It is certified that error appears in the above-identified patent and that said Letters Patent is hereby corrected as shown below:

On the title page item [73], add --Motorola, Inc., Schaumburg, Illinois--

Signed and Sealed this

Twenty-eighth Day of April, 1998

Attest:

BRUCE LEHMAN

Attesting Officer

*Commissioner of Patents and Trademarks*